(12) United States Patent
Bach et al.

(10) Patent No.: US 10,151,365 B2
(45) Date of Patent: Dec. 11, 2018

(54) ELECTROMECHANICALLY ACTUABLE EXPANDING DEVICE FOR A DRUM BRAKE

(71) Applicant: Continental Teves AG & Co. oHG, Frankfurt (DE)

(72) Inventors: Uwe Bach, Niederseelbach (DE); Jens Hoffmann, Darmstadt (DE); Martin Gädke, Hofheim/Ts. (DE); Holger von Hayn, Bad Vilbel (DE); Ahmed Sefo, Frankfurt (DE); Thorsten Lahr, Wiesdaden (DE); Wolfgang Ritter, Oberursel/Ts. (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 15/533,899

(22) PCT Filed: Dec. 14, 2015

(86) PCT No.: PCT/EP2015/079519
§ 371 (c)(1),
(2) Date: Jun. 7, 2017

(87) PCT Pub. No.: WO2016/096680
PCT Pub. Date: Jun. 23, 2016

(65) Prior Publication Data
US 2017/0363164 A1  Dec. 21, 2017

(30) Foreign Application Priority Data

Dec. 17, 2014 (DE) ..................... 10 2014 226 268

(51) Int. Cl.
*F16D 65/56* (2006.01)
*F16D 51/22* (2006.01)
(Continued)

(52) U.S. Cl.
CPC ........... *F16D 65/563* (2013.01); *F16D 51/22* (2013.01); *F16D 65/22* (2013.01); *F16D 65/562* (2013.01);
(Continued)

(58) Field of Classification Search
CPC ...... F16D 65/861; F16D 65/563; F16D 65/22; F16D 51/22; F16D 2125/36; F16D 2125/40; F16D 2125/405
(Continued)

(56) References Cited

U.S. PATENT DOCUMENTS 1,846,161 A    2/1932  Taylor
2,130,875 A *  9/1938  Colman ................ F16D 65/561
                                                        188/152

(Continued)

FOREIGN PATENT DOCUMENTS

DE     1605978 C3    8/1979
FR     2869661 A1   11/2005
(Continued)

OTHER PUBLICATIONS

International Search Report and Written Opinion for International Application No. PCT/EP2015/079519, dated Apr. 25, 2016, 6 pages.
(Continued)

*Primary Examiner* — Thomas J Williams
(74) *Attorney, Agent, or Firm* — RatnerPrestia (57) ABSTRACT

An expanding device for actuating one of the brake shoes of a drum brake includes a body of revolution and transmission bodies actuated by the body of revolution via ball track ramps. A spacer body is located between two partial bodies of the body of revolution, the spacer body guided by an adjustment spring keeping the partial bodies at the respectively reached distance. The spacer body is screwed onto a pin on the first partial body. A readjustment nut ensures that,
(Continued)

when the two partial bodies are pushed apart, the spacer body rotates on the pin and moves away from a supporting surface on a partition of the second partial body. Upon renewed actuation of the brakes, the readjustment nut is guided such that the spacer body bears against the second partial body, but takes up a different position on the pin, the position corresponding to the air clearance readjustment.

13 Claims, 6 Drawing Sheets (51) Int. Cl.
*F16D 65/22* (2006.01)
*F16D 121/24* (2012.01)
*F16D 125/36* (2012.01)
*F16D 125/40* (2012.01)

(52) U.S. Cl.
CPC ...... *F16D 2121/24* (2013.01); *F16D 2125/36* (2013.01); *F16D 2125/40* (2013.01)

(58) Field of Classification Search
USPC ...... 188/325, 327, 328, 79.51, 79.54, 79.62, 188/196 BA, 196 B, 196 R, 196 P, 196 D, 188/196 V
See application file for complete search history.

(56) References Cited

U.S. PATENT DOCUMENTS

| | | | | |
|---|---|---|---|---|
| 3,115,217 | A | * | 12/1963 | Butler ............... F16D 55/30 188/196 R |
| 3,392,806 | A | * | 7/1968 | Knapp ............... F16D 55/224 188/196 BA |
| 3,443,670 | A | | 5/1969 | Margetts |
| 4,850,459 | A | | 7/1989 | Johannesen et al. |

FOREIGN PATENT DOCUMENTS

| | | |
|---|---|---|
| JP | H02217631 A | 8/1990 |
| JP | H03500919 A | 2/1991 |

OTHER PUBLICATIONS

German Search Report for German Application No. 10 2014 226 268.2, dated Oct. 8, 2015, including partial English translation, 8 pages.

Notification of Reasons for Refusal for Japanese Application No. 2017-531731, dated Apr. 13, 2018, including English translation, 4 pages.

* cited by examiner

ELECTROMECHANICALLY ACTUABLE EXPANDING DEVICE FOR A DRUM BRAKE

CROSS REFERENCE TO RELATED APPLICATIONS

This application is the U.S. National Phase Application of PCT International Application No. PCT/EP2015/079519, filed Dec. 14, 2015, which claims priority to German Patent Application No. 10 2014 226 268.2, filed Dec. 17, 2014, the contents of such applications being incorporated by reference herein.

FIELD OF THE INVENTION

The invention relates to an electromechanically operable expansion device for a drum brake provided with a readjustment device.

BACKGROUND OF THE INVENTION

Hydraulic expansion devices, which have a wheel brake cylinder which is connected via a hydraulic line to a brake pressure generator, e.g. to a pedal-operated brake master cylinder, are known.

Electromechanical expansion devices, such as an electric motor-driven cam which is located at the position of the wheel brake cylinder, have already been proposed, especially for electric vehicles.

For operating disk brakes, provision has also already been made for roll ramps in which balls on ramp-like ball tracks are provided between two bodies. By rotation of the one body the balls run up the ramps and in the process force apart the two bodies, which leads to operation of the brake.

In the case of expansion devices for drum brakes, there is particularly the problem that these are provided with a readjustment device which ensures that the air gap between the brake shoes and the brake drum of a drum brake is readjusted incrementally.

The stroke, which an expansion device of the above-described type can provide, is not sufficient to realize a sufficiently large adjustment range for readjusting the drum brake so that such expansion devices have not yet been used up to now for drum brakes.

SUMMARY OF THE INVENTION

An aspect of the invention is an expansion device for a drum brake which is provided with a readjustment device.

For solving the problem, an aspect of the invention provides that the expansion device has a rotating body, which is rotatable around a rotational axis, with an end face extending perpendicularly to the rotational axis, and a transmission body, secured against rotation around said rotational axis, with a pressure face disposed opposite the end face, wherein at least three balls, which run in ball tracks on the end face and on the pressure face, are arranged between the end face and the pressure face in a circle which extends coaxially to said rotational axis, and wherein at least the ball tracks of one face are designed in each case as a ramp, and that the rotating body consists of two body parts which are displaceable against each other in the axial direction and are held at a distance by a positionally variable spacer body.

If the brake linings are worn by a certain amount, the readjustment device of the drum brake creates the effect of the brake shoes not being returned again to their initial braking position but only to such extent that the constructionally provided initial air gap between the brake shoes and the brake drum is re-created. Therefore, the transmission body does not have to be completely returned either so that it remains in abutment against the top end of a brake shoe. The invention creates the effect of the spacer body holding the transmission body in abutment against the top end of the brake shoe, wherein the balls are again located in their initial position on the ball tracks so that with a renewed brake operation the complete operating range of the expansion device is available again.

In order to support this, the body parts are loaded in the direction of a larger distance by an expander spring which is arranged between them. The expander spring therefore creates the effect of the expansion device always being in abutment against the top ends of the brake shoes. The spacer body prevents the effect of the body parts falling back behind an initially achieved distance.

In accordance with the readjustment of the drum brake, the spacer body has in effect to be extended. To this end, it is provided that the spacer body has a thread which engages in a mating thread on the first body part, wherein the threaded connection is a self-locking locking drive, and that the spacer body butts against a support surface of the second body part which is disposed opposite the first body part.

This allows the spacer body to be adapted after a readjustment to a newly established initial position of the brake shoes. Specifically, if the two body parts have moved away from each other on account of a readjustment, the spacer body is rotated on the mating thread on the first body part and therefore comes to butt against the first body part again. As a result, a new minimum distance between the two body parts is defined.

So that the mentioned rotation occurs, it is provided that the spacer body has a readjustment nut which butts against a friction surface of the second body part which is disposed opposite the support surface, and that a threaded connection between the readjustment nut and the spacer body is designed as a non-self-locking running drive.

If the two body parts are pushed apart by the expander spring, the readjustment nut first of all butts against the friction surface so that the threaded connection between the spacer body and the first body part acts like a spindle and ensures that the spacer body rotates on the mating thread and compensates in part the ensuing gap between the spacer body and the support surface.

During the subsequent brake operations, this process is repeated until the gap is completely closed and the spacer body is displaced in relation to the first body part to such extent that the readjustment of the air gap is completely compensated.

In this case, the spacer body consists of a sleeve with a female thread which on a male thread forming the mating thread is screwed onto a spigot on the first body part.

Furthermore, an aspect of the invention provides that the sleeve has an axially extending shank which has a male thread for the readjustment nut, wherein the shank projects through a partition of the second body part and the readjustment nut butts against the rear wall of the partition which points away from the first body part.

So that the friction forces between the readjustment nut and the second support surface are increased, it is provided that the rear wall has a conical recess for the readjustment nut. This therefore butts by one edge against the conical surface of the recess.

So that the readjustment nut is again brought to butt against the friction surface, an adjustment spring is arranged between the readjustment nut and the second body part.

During a first brake operation after a readjustment, in particular the two body parts are first of all pressed together until the spacer body again butts against the support surface. In the process, the readjustment nut is released from the friction surface. This gap which ensues in the process is again closed by the adjustment spring rotating the nut on its thread until it again comes to butt against the second stop face.

The adjustment spring is preferably designed as a cylindrical spring which is arranged coaxially to the shank and is supported on the readjustment nut via a bearing ring and a thrust bearing. Since the running drive is not self locking, the axial force which is exerted by the adjustment spring causes a rotation of the readjustment nut.

An alternative embodiment of the adjustment spring entails it being arranged coaxially to the shank and being connected via pins at its ends to the second body part and to the readjustment nut. The torsional effect of the adjustment spring directly exerts torque upon the readjustment nut.

In order to realize an easy and smooth rotation of the rotating body in the housing of the expansion device, the invention furthermore provides that the rotating body is rotatably supported around its axis in the housing of the expansion device by means of one or more needle bearings.

BRIEF DESCRIPTION OF THE DRAWINGS

In the following text, aspects of the invention shall be explained in more detail based on an exemplary embodiment. To this end, in the drawing.

DETAILED DESCRIPTION OF THE PREFERRED EMBODIMENTS

Figure 1:
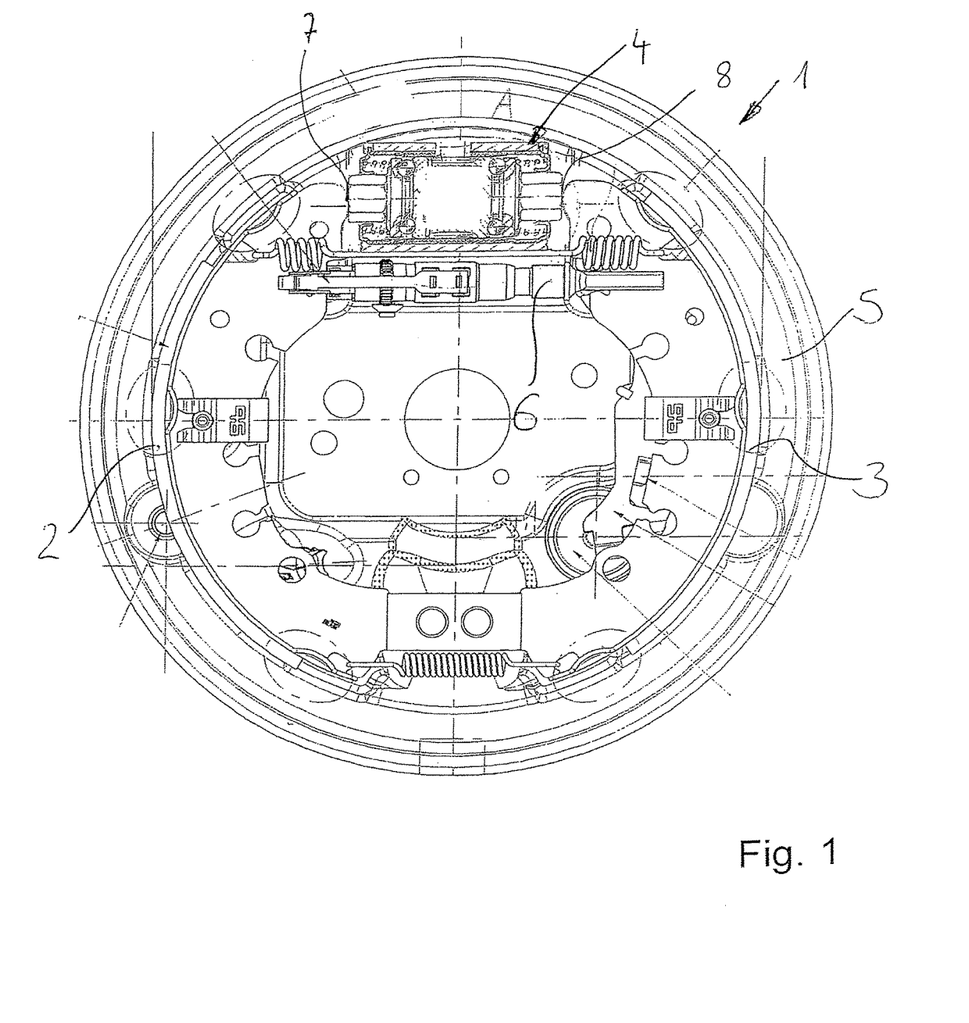
FIG. 1 shows a plan view of a drum brake having an expansion device according to an aspect of the invention.

Reference is first all made to FIG. 1. This shows a drum brake 1 with two brake shoes 2, 3 which are pivotably mounted at their lower end and between the upper top ends of which, which form in each case pressure faces 7, 8, an expansion device 4 is arranged.

When this is operated, the two brake shoes 2, 3 are pushed apart so that under pressure they butt against a brake drum, not shown here, of a vehicle wheel. The friction forces which ensue in the process create a rotational deceleration of the wheel and therefore braking of the vehicle.

The linings of the brake shoes 2, 3 are gradually worn in the process so that the air gap between the brake shoes and the brake drum would gradually become larger. Therefore, provision is made for a readjustment device 6 which is arranged beneath the expansion device 4 and is designed so that if the air gap exceeds a specific value after a multiplicity of brake operations it allows a resetting of the brake shoes 2, 3 only to such extent that the original air gap is re-established. Such readjustment devices 6 are known and therefore do not need to be explained in more detail.

A readjustment, however, results in the brake shoes themselves not reaching their original position so that an expansion device which is completely reset according to the prior art no longer butts directly against the pressure faces 7, 8 of the brake shoes.

Figure 2:
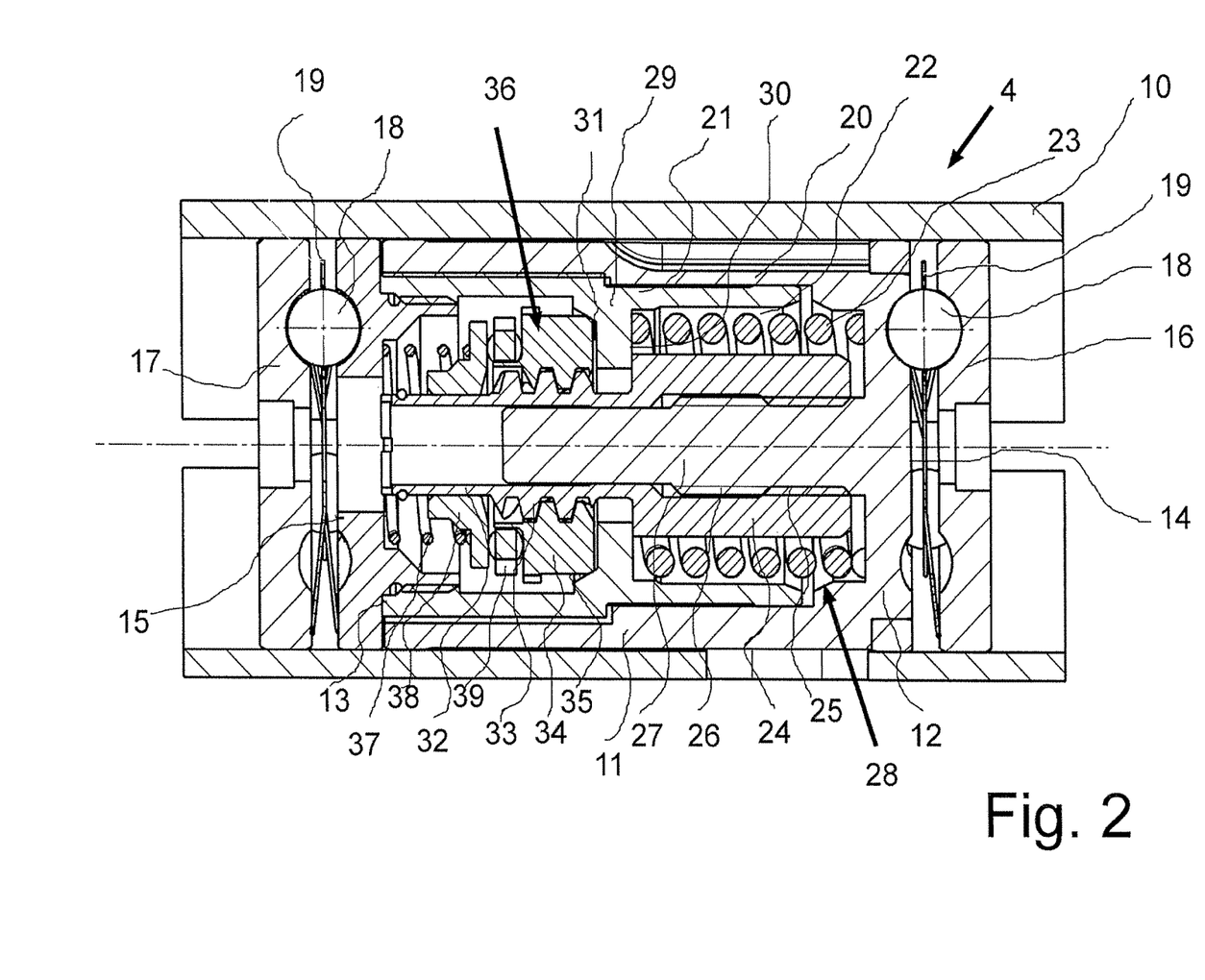
FIG. 2 shows a cross section through the expansion device according to the invention, in which, because the linings of the brake shoes are still new, a minimum distance between the two parts of the expansion device is established by the distance sleeve.

This has to be taken into consideration in the design of the expansion device 4. In FIG. 2, a first embodiment of the expansion device is shown for this. A rotating body 11, which consists of a first body part 12 and a second body part 13, is arranged in a sleeve-like housing 10 in a manner rotatably supported around its rotational axis. Located on the outer side of the rotating body 11 are two end faces 14, 15 opposite which is a transmission body 16, 17 in each case. These project from the housing 10 on both sides by extensions which butt against the pressure faces 7, 8 of the top ends of the brake shoes 2, 3.

Located between the rotating body 11 and the two transmission bodies 16, 17 in each case are three balls 18 which are retained by a cage 19 in a circle coaxially to the rotational axis of the rotating body.

Located both on the end faces 14, 15 of the body parts 12, 13 and on the end faces of the oppositely disposed transmission bodies 16, 17 in each case are ramp-like roller tracks which create the effect of the transmission bodies 16, 17 being moved away from the rotating body if this is rotated around its rotational axis. If this is the case, the transmission bodies 16, 17 push the top ends of the brake shoes apart.

The body parts 12, 13 have in each case a sleeve-like section 20, 21 which are inserted one into the other, wherein the two sections 20, 21 via a tongue and groove connection, a spline or the like are retained in a manner in which they are resistant to rotation but axially displaceable against each other.

The inner sleeve-like section 21 includes an inner space 22. Located there is a expander spring 23 which pushes apart the two body parts 12, 13 and therefore keeps the transmission bodies 16, 17 in abutment against the pressure faces, not shown here, at the top ends of the brake shoes 2, 3.

A spacer body 24 in the form of a sleeve is also located in the space 22. The spacer body 24 has a female thread 25 which with a male thread 26 is screwed on a spigot 27 projecting on the inner side of the first body part, forming a spindle drive. Since the female thread 25 and the male thread 26 have a small pitch, it takes the form of a self-locking spindle drive which in the following text is to be referred to as a locking drive 28. A rotation of the spacer body 24 creates the effect of this being screwed forward or backward on the spigot 27, depending on rotational direction. On the other hand, on account of the self locking of the locking drive 28 in the event of an axial pressure load on the locking drive in the course of a brake operation, no rotation of the spacer body 24 on the spigot 27 takes place.

The second body part 13 has a partition 29 with a central opening. The spacer body 24, by means of a shoulder, butts against the front side of the partition 29, forming a support surface 30, which points toward the first body part 12. A shank 32 of the spacer body 24 points through the opening 31. On the rear side of the partition 29, the shank 32 has a male thread 33 on which is screwed a readjustment nut 34.

The rear wall has a conical recess 35 in which lies the readjustment nut 34, wherein its edges butt against the conical surface of the recess 35.

In contrast to the locking drive 28 between the spacer body 24 and the spigot 27, the spindle drive, consisting of the threads of the readjustment nut 34 and of the shank 32, have a large pitch and is therefore not self-locking. An axial loading of the readjustment nut therefore leads to a screw movement of readjustment nut 34 and spacer body 24 in relation to each other. This spindle drive is therefore to be referred to as a rotating drive 36 in the following text.

Furthermore, an adjustment spring 37, which is designed as a cylindrical spring and is arranged coaxially to the shank 32, acts on the readjustment nut 34.

The principle of operation of the readjustment nut is explained in the following text with reference to FIGS. 2, 3 and 4.

In this case, it has to be kept in mind that the readjustment nut 34 together with the spacer body 24 forms a rotating drive 36 so that in the event of an axial loading of the rotating drive the readjustment nut 34 rotates on the shank 32 or the shank 32 rotates in the readjustment nut 34 so that the relative axial position of shank 32 and readjustment nut 34 is altered.

In contrast to this, the thread between the spigot 27 and the spacer body 24 forms a locking drive 28.

The two body parts 12, 13 are retained at a specific distance which is determined by the spacer body 24 butting against the support surface 30 and on account of the self locking of the locking drive 28 in the event of an axial loading, as occurs during a brake operation, does not move on the spigot 27.

In the case of wear of the brake linings beyond a specific amount, a readjustment device, not shown here, ensures that the brake shoes do not revert back to their original position but only to such extent that the constructionally provided air gap between the brake lining and the brake drum is re-established. This in turn results in a gap initially remaining between the transmission bodies 16, 17 and the brake shoes but which is compensated by the expander spring 23 pushing apart the two body parts 12, 13.

In this case, an axial tensile loading is exerted upon the spacer body 24 which results in this being rotated in the readjustment nut 34 since this butts against the conical surface of the recess 35 and the ensuing friction forces there prevent rotation of the readjustment nut 34.

Therefore, the spacer body 24 inevitably rotates on the spigot 27 and alters its axial position with regard to the spigot 27. This leads to the spacer body moving away from the support surface 30 and a gap s ensuing which is slightly smaller than the sum of the two distances to be bridged between the transmission bodies 16, 17 and the top ends of the brake shoes.

In any event, the transmission bodies 16, 17 again find themselves in abutment against the brake shoes on account of the force of the expander spring 23.

Figure 3:
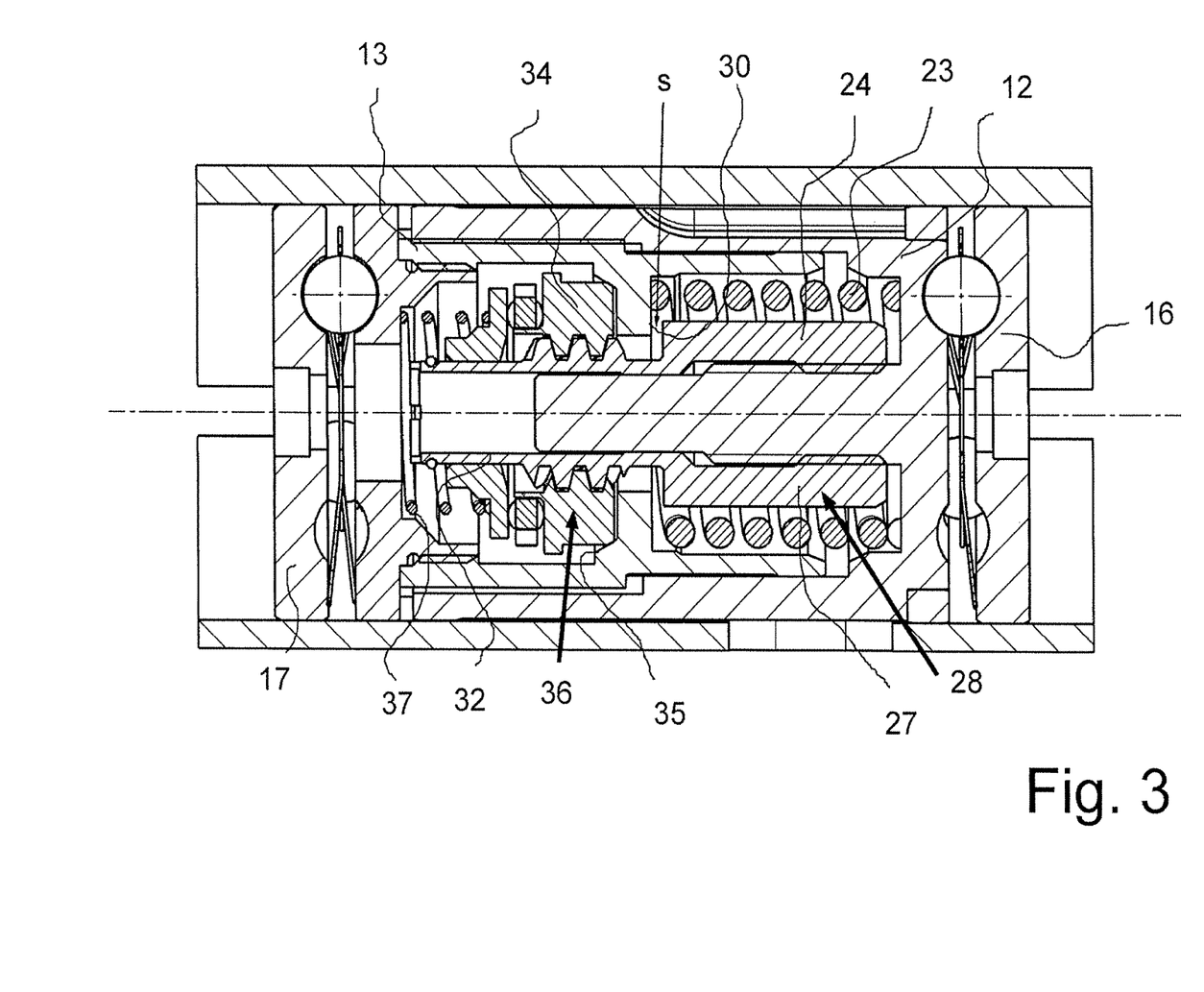
FIG. 3 shows a cross section through the expansion device according to the invention, in which is shown an intermediate position of the distance sleeve which it occupies during a readjustment process.

With a renewed operation of the brake, the intermediate position, shown in FIG. 3, results initially in the two body parts 12, 13 again being pressed together against the force of the expander spring 23, as a result of which the readjustment nut 34 is released from the recess 35 and by means of the adjustment spring 37 experiences torque which rotates the readjustment nut 34 again into the recess 35. The position of the spacer body 24 on the spigot 27 remains unaltered during this on account of the self locking of the locking drive 28.

After braking has finished, the expander spring 23 will again push apart the two body parts 12, 13, wherein, as described above, the spacer body 24 again rotates on the spigot 27, wherein the gap s between the spacer body 24 and the support surface 30 becomes slightly smaller again until after several brake operations it is completely closed and the readjustment of the air gap has been completely compensated as a result of a corresponding rotation of the spacer body 24 on the shank 32.

Figure 4:
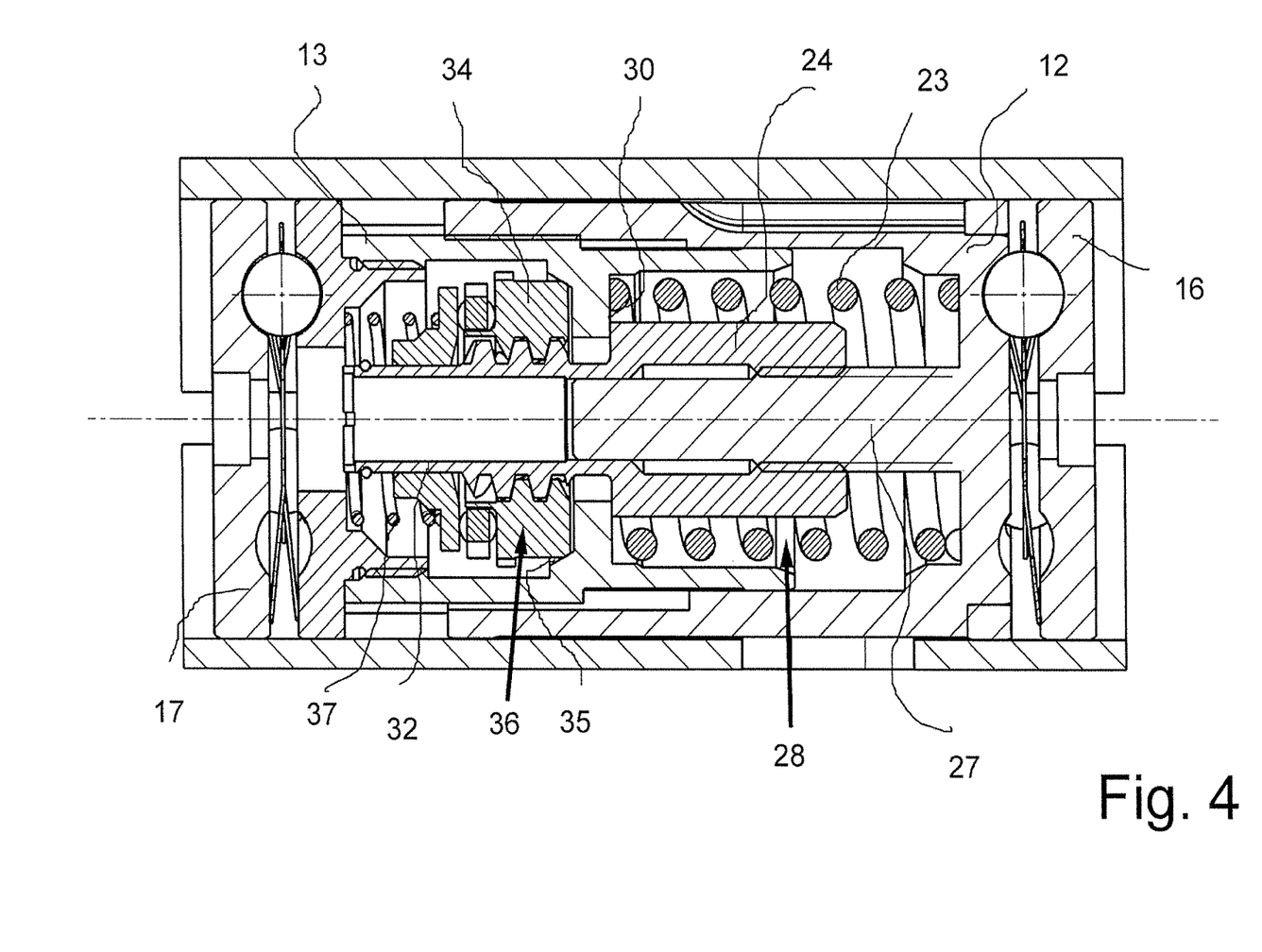
FIG. 4 shows a cross section through the expansion device according to an aspect of the invention, in which the position of the distance sleeve in relation to the parts of the expansion device in the case of largely worn brake linings and a maximum distance between the two parts of the expansion device are established.

Therefore, several subsequent brake operations are necessary until the spacer body 24 again butts against the support surface 30, as shown in FIG. 4, and—providing the initial position is re-established—wherein the position of the spacer body 24 in relation to the spigot 27 or to the body parts 12, 13 has nevertheless been altered and therefore a new distance between the two body parts 12, 13, taking into consideration the readjustment of the brake shoes, has been established.

How many subsequent brake operations are necessary for this is determined by the ratio of the pitches of rotating drive and locking drive and the increment of the external readjustment of the air gap.

The adjustment spring 37 can be used in two embodiments. In FIGS. 2-4, a first embodiment is shown. The adjustment spring 37 is designed as a cylindrical spring which is supported on one side on the bottom of the second body part 13 and is supported on the other side, via a ring 38 and a bearing ring 39, on the readjustment nut 34. The axial force of the adjustment spring 37 leads to a rotation of the readjustment nut on the shank 32 providing it is not in abutment in the recess.

Figure 5:
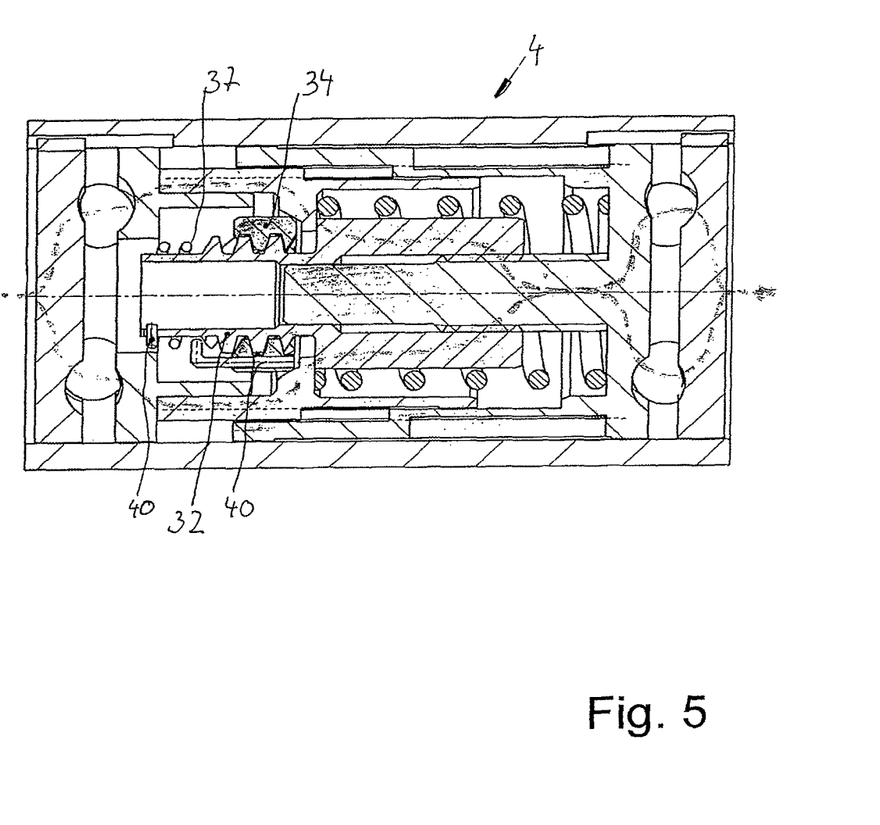
FIG. 5 shows an alternative spring loading of a readjustment nut of the expansion device and FIG. 6 shows an alternative supporting of a rotatable sleeve in the expansion device.

An alternative embodiment of the adjustment spring 37 is shown in FIG. 5. In this case, the adjustment spring 37 is designed as a torsion spring which, however, at its two ends merges in each case into a pin 40 which at one end is connected to the second body part 13 and at the other end is connected to the readjustment nut 34. The adjustment spring is torsioned so that it can exert torque upon the readjustment nut 34, which also leads to rotation of the readjustment nut 34 on the shank 32 if the readjustment nut is not in abutment in the recess.

Applicable to all embodiments described above is that with a renewal of the brake linings the spacer body 24 is returned to its initial position, shown in FIG. 2, from the outside, e.g. via a hole in the transmission body 16, by means of a tool.

Figure 6:
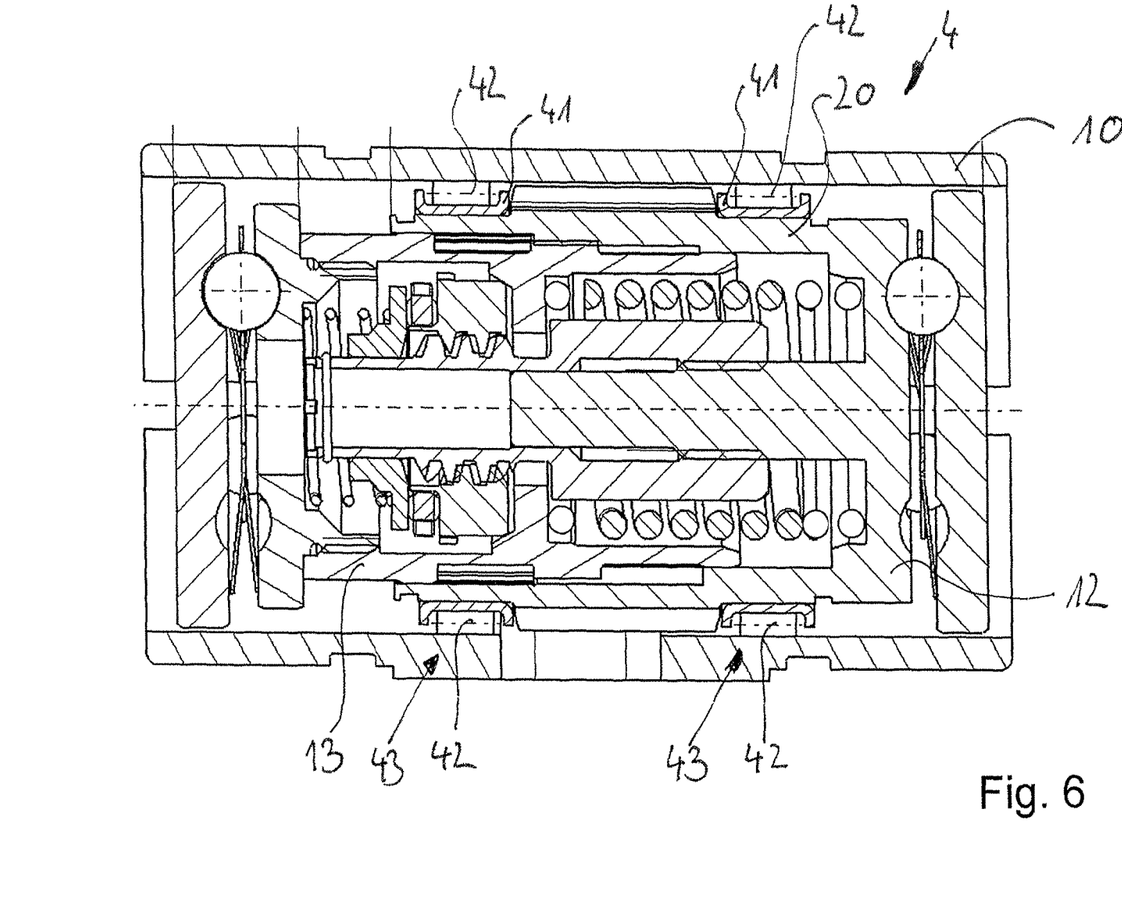

FIG. 6 shows an alternative or an improved embodiment of an expansion device 4 according to FIGS. 2 to 4.

FIG. 6 shows the expansion device in a position in which a maximum distance is established between the two parts of the expansion device. This corresponds to the view in FIG. 4.

In the previously shown embodiments, a plain bearing of the first body part 12 is provided in the housing 10 of the expansion device 4.

In the improved embodiment, the plain bearing is replaced by a rolling bearing.

To this end, two roller tracks 41, which are U-shaped in cross section and the rolling surfaces of which disposed equidistantly opposite the generated surface of the housing 10, are located in an encircling manner on the sleeve-like section 20 of the first body part 12.

Located in the gap between the rolling surface and the generated surface of the housing are a multiplicity of rollers 42 which on one side roll on the rolling surface and on the other side roll on the generated surface.

The first body part 12 is therefore rotatably supported in the housing 10 by means of two needle bearings 43, as a result of which a more pressure-free setup is possible.

LIST OF DESIGNATIONS

1 Drum brake
2 Brake shoe
3 Brake shoe
4 Expansion device
5 Support plate
6 Readjustment device
7 Pressure face
8 Pressure face
10 Housing
11 Rotating body
12 First body part
13 Second body part
14 End face
15 End face
16 Transmission body
17 Transmission body
18 Ball
19 Cage
20 Sleeve-like section
21 Sleeve-like section
22 Space
23 Expander spring
24 Spacer body
25 Female thread
26 Male thread
27 Spigot
28 Locking drive
29 Partition
30 Support surface
31 Opening
32 Shank
33 Male thread
34 Readjustment nut
35 Recess
36 Rotating drive
37 Adjustment spring
38 Ring
39 Thrust bearing
40 Pins
41 Roller track
42 Rollers
43 Needle bearing

The invention claimed is:

1. A expansion device for a drum brake the expansion device comprising:
a rotating body, which is rotatable around a rotational axis, with an end face extending perpendicularly to the rotational axis, and
a transmission body, which is secured against rotation around said rotational axis, with a pressure face disposed opposite the end face,
wherein at least three balls, which run in ball tracks on the end face and pressure face, are arranged between the end face and the pressure face in a circle which extends coaxially to said rotational axis, and
wherein at least the ball tracks of one face are designed in each case as a ramp, and the rotating body comprises a first and a second body part which are displaceable against each other in the axial direction and which are held at a distance by a positionally variable spacer body.

2. The expansion device as claimed in claim 1, wherein the body parts are loaded in the direction of a greater distance by an expander spring which is arranged between them.

3. The expansion device as claimed in claim 1, wherein the spacer body has a thread which engages in a mating thread on the first body part, wherein the threaded connection is a self-locking locking drive, and in that the spacer body butts against a support surface of the second body part which is disposed opposite the first body part.

4. The expansion device as claimed in claim 3, wherein the spacer body has a readjustment nut which butts against a friction surface of the second body part which is disposed opposite the support surface, and wherein a threaded connection between the readjustment nut and the spacer body is designed as a non-self-locking rotating drive.

5. The expansion device as claimed in claim 4, wherein the spacer body comprises a sleeve with a female thread which on a male thread forming the mating thread is screwed on a spigot on the first body part.

6. The expansion device as claimed in claim 5, wherein the sleeve has an axially extending shank which has a male thread for the readjustment nut, wherein the shank projects through a partition of the second body part and the readjustment nut butts against a rear wall of the partition which points away from the first body part.

7. The expansion device as claimed in claim 6, wherein the rear wall has a conical recess for the readjustment nut.

8. The expansion device as claimed in claim 1, wherein an adjustment spring is functionally arranged between the readjustment nut and the second body part.

9. The expansion device as claimed in claim 8, wherein the adjustment spring is a cylindrical spring which is arranged coaxially to the shank and is supported via a bearing ring on the readjustment nut.

10. The expansion device as claimed in claim 8, wherein the adjustment spring is a cylindrical spring which is arranged coaxially to the shank and is connected to the second body part and to the readjustment nut via pins at its ends.

11. The expansion device as claimed in claim 1, wherein the rotating body is rotatably supported around its axis in a housing of the expansion device by one or more needle bearings.

12. The expansion device as claimed in claim 2, wherein the spacer body has a thread which engages in a mating thread on the first body part, wherein the threaded connection is a self-locking locking drive, and in that the spacer body butts against a support surface of the second body part which is disposed opposite the first body part.

13. The expansion device as claimed in claim 1, wherein the drake drum further comprises a readjustment device.

* * * * *